United States Patent [19]

Nago et al.

[11] Patent Number: 4,735,865

[45] Date of Patent: Apr. 5, 1988

[54] MAGNETIC HEAD CORE

[75] Inventors: Kumio Nago; Masaru Kadono; Tatsushi Yamamoto; Tetsurou Muramatsu, all of Nara; Mitsuhiko Yoshikawa, Ikoma, all of Japan

[73] Assignee: Sharp Kabushiki Kaisha, Osaka, Japan

[21] Appl. No.: 871,273

[22] Filed: Jun. 6, 1986

[30] Foreign Application Priority Data

Jun. 10, 1985 [JP] Japan .................. 60-125522
Jun. 10, 1985 [JP] Japan .................. 60-125523

[51] Int. Cl.⁴ .................................... B22D 25/00
[52] U.S. Cl. ...................... 428/610; 420/78; 420/79; 148/309
[58] Field of Search ............... 148/309; 420/78, 79; 428/610

[56] References Cited

FOREIGN PATENT DOCUMENTS 0159028 10/1985 European Pat. Off. ........... 148/309
0159027 10/1985 European Pat. Off. ........... 148/309
2255975 5/1974 Fed. Rep. of Germany ...... 148/121
53-57118 5/1978 Japan ................................. 148/121
58-82508 5/1983 Japan ................................. 148/309

Primary Examiner—John P. Sheehan
Attorney, Agent, or Firm—Birch, Stewart, Kolasch & Birch

[57] ABSTRACT

Disclosed is a magnetic head core material having very high corrosion resistance even under severe conditions and a method for preparing the same. The material consists of 3 to 6 wt % of aluminum, 7 to 12 wt % of silicon, not more than 3 wt % of chromium and the substantial balance being iron.

2 Claims, 6 Drawing Sheets

MAGNETIC HEAD CORE

FIELD OF THE INVENTION

The present invention relates to a magnetic head core material, more particularly, to a magnetic head core material having high corrosion resistance, and a method for preparing the same.

BACKGROUND OF THE INVENTION

In the magnetic recording field, the amount of information to be transacted has increased in computer systems and other recording media. It therefore is desired to increase recording data density. To satisfy this demand high magnetic permeability and high saturation magnetic flux density are required for magnetic head core materials. A magnetic head core is also required to have high wear resistance and corrosion resistance.

It is known that a Sendust alloy consisting of silicon of 9.5 wt%, aluminum of 5.5 wt% and the rest of iron exhibits high magnetic permeability and high saturation magnetic flux density. The Sendust alloy also has high hardness, i.e. a Vickers hardness of 450 to 500, and has high wear resistance. Accordingly it is highly used for magnetic heads in Video Tape recording systems for broadcasting, because the magnetic head is employed under a higher relative velocity to the recording tapes. Even a Sendust alloy having such a high wear resistance exhibits defects in particular conditions, such as where a tape having a high degree of abrasion is employed or where the head is used in humid air.

It has been found by the present inventors that the aforesaid defects, especially abrasion in a moist atmosphere, is brought about by both chemical reaction and mechanical defacement occurring between a magnetic head and a magnetic tape in some cases. It is strongly desired that a Sendust alloy possess not only high magnetic permeability and high saturation magnetic flux density but also possess high wear resistance and corrosion resistance.

SUMMARY OF THE INVENTION

The present invention is to provide a magnetic head core material having very high corrosion resistance. The magnetic head core material consists of 3 to 6 wt % of aluminum, 7 to 12 wt% of silicon, not more than 3 wt % of chromium and the rest of iron.

The present invention also provides a method for preparing the magnetic head core material, comprising radiating electron beams to an alloy tablet or composition as an evaporating source consisting of 3 to 6 wt % of aluminum, 20 to 30 wt % of silicon, not more than 3 wt % of chromium and the rest of iron in vacuum to deposit a magnetic thin film on a substrate, and annealing the deposited magnetic thin film at a temperature of 400° to 800° C.

PREFERRED EMBODIMENT OF THE PRESENT INVENTION

Figure 1:
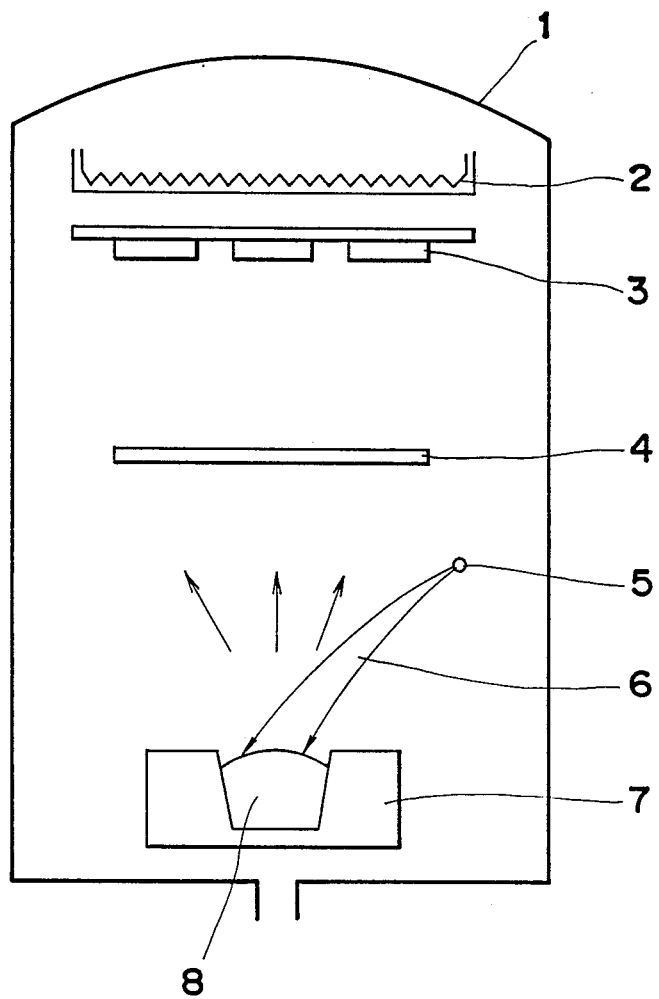
FIG. 1 shows a schematic view of an electron beam evaporation apparatus used in the practice of the present invention.

A heater 2 and a substrate 3 are located in an upper portion of a vacuum bell jar 1. The heater 2 is used for heating the substrate 3. The substrate 3 is composed of crystallized glass, ceramics and the like. In a lower portion of the bell jar 1, a hearth 7 is positioned and an alloy or composition as the evaporating source 8, comprising iron, aluminum, silicon and chromium, is placed thereon. A shutter 4 is located between the substrate 3 and the hearth 7. The alloy or composition 8 is irradiated by electron beam 6 rised from an electron beam filament 5. When the alloy or composition is irradiated with electron beams vapors from the metals of the alloy or composition are formed and deposited on the substrate 3.

The alloy or composition 8 of the present invention contains 3 to 6 wt % of aluminum, 20 to 30 wt % of silicon, not more than 3 wt % of chromium and the rest of iron. The alloy or composition is melted by the electron beam in a vacuum and a vapor containing the metal elements is formed. The metal elements are deposited on the substrate 3 only when the shutter 4 is opened. The electric power of the electron beam is generally 10 KW and is maintained for a period of time, e.g. about 2 to 10 minutes, while the shutter 4 is closed. Then the shutter 4 is opened to deposit a thin film on the substrate and, after obtaining a desired thickness of the film, the shutter 4 is closed again.

Figure 2:
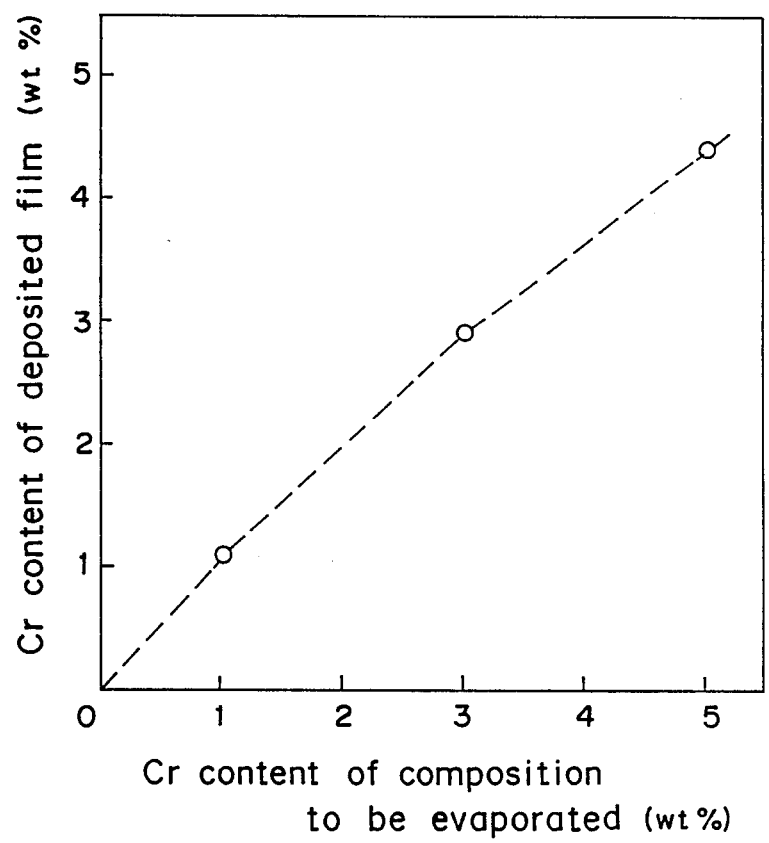
FIG. 2 is a graph showing a relation between an amount of chromium in an alloy or composition and an amount of chromium in the deposited thin film.

The amount of chromium in the film is controlled by changing the amount of chromium in the alloy or composition 8. FIG. 2 shows the relation between an amount of chromium in an alloy or composition 8 and an amount of chromium in the deposited thin film. As seen in FIG. 2, the chromium content in the deposited thin film increases in proportion to the chromium content in the alloy or composition 8.

Figure 3:
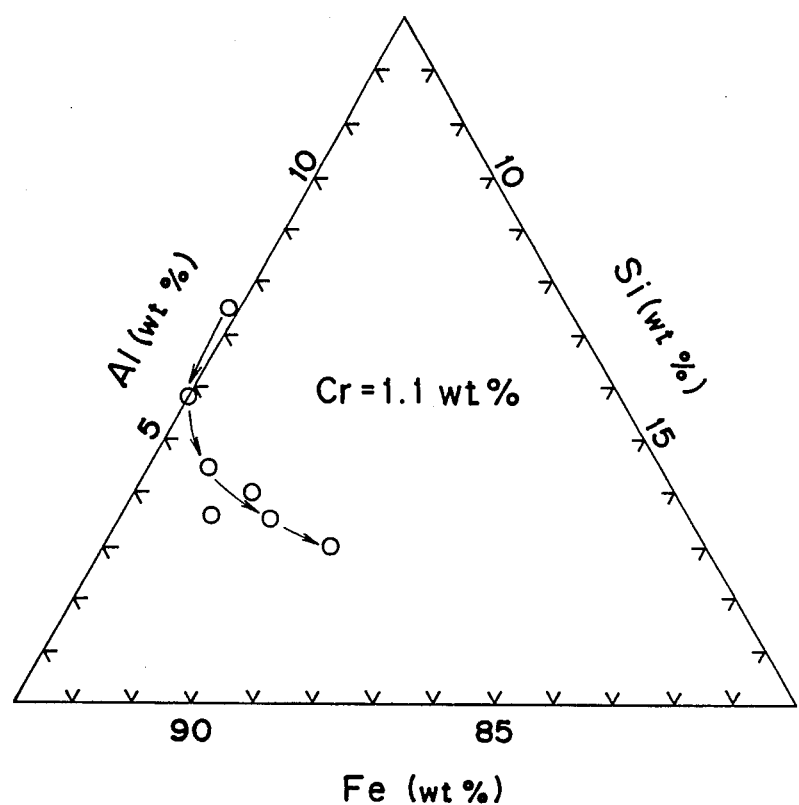
FIG. 3 is a graph showing one typical compositional distribution in the film thickness direction of the deposited thin film.

For instance a thin film in thickness of 5 micrometer consisting of 8.4 wt% of silicon, 4.9 wt% of aluminum, 1.1 wt% of chromium and the rest of iron was obtained by irradiating an electron beam at an electric power of 10 KW to the composition comprising 27 wt% of silicon, 4 wt% of aluminum, 1 wt% of chromium and the rest of iron and depositing the chromium on the substrate at a substrate temperature of 300° C. for an opening period of the shutter 4 of 12 minutes. The compositional distribution in the film thickness direction of the thin film was determined to plot in a triangle graph, which is shown in FIG. 3. The determination was carried out by an energy dispersion-type analysis due to a scanning electron microscope from the substrate to the surface of the film. This shows that the compositional distribution in the thickness direction is preferably controlled to the range of 1 to 10 wt% of aluminum and 6 to 12 wt% of silicon. The thin film is then heated at 600° C. for 4 hours in vacuum to obtain a magnetic head core member having an electric resistivity of 87 $\mu\Omega$cm, a coercive force of 0.6 Öe, a saturation magnetic flux density 12,000 G, an effective permeability at 1 MHz of 2,800 and at 10 MHz of 1,200.

Figure 4:
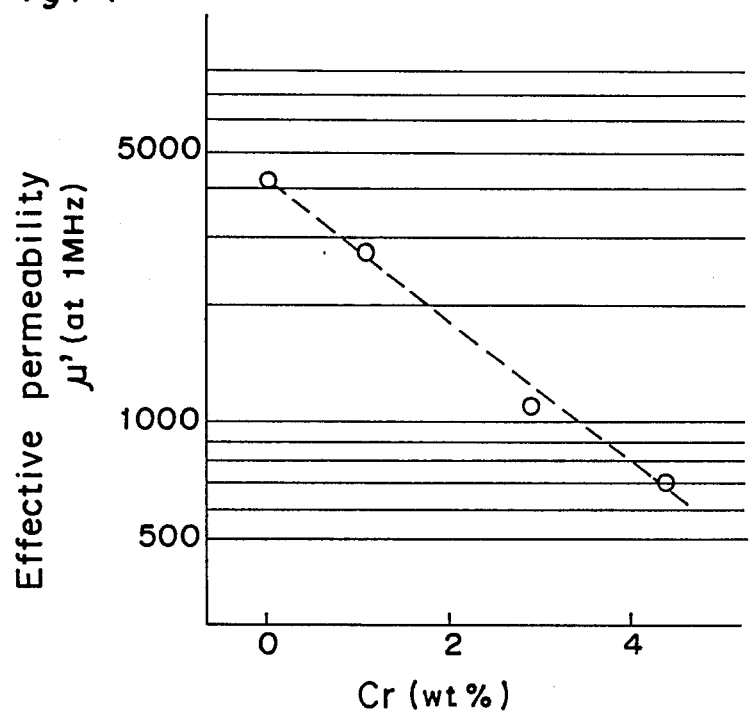
FIGS. 4 to 10 are graphs showing magnetic properties, electric property, physical properties and lattice constant determined X-ray diffraction method ploted against chromium content of the deposited thin films respectively.
Figure 5:
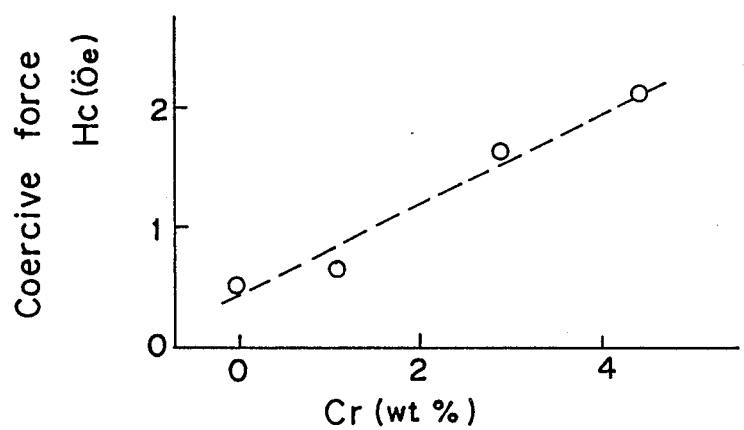
Figure 6:
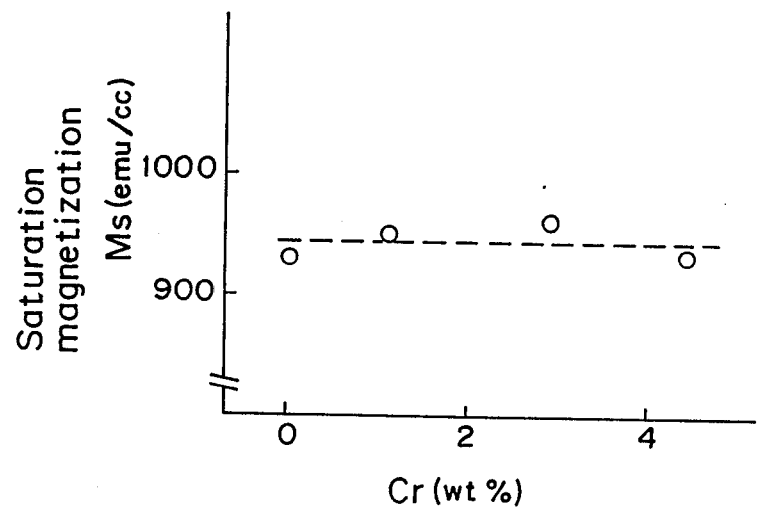
Figure 7:
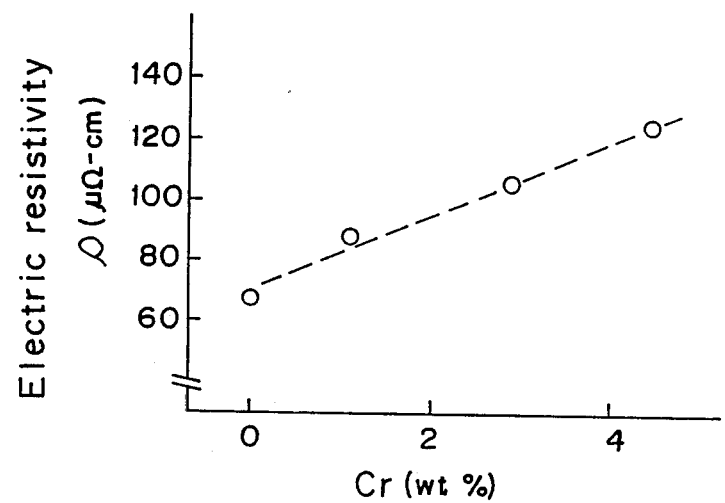
Figure 8:
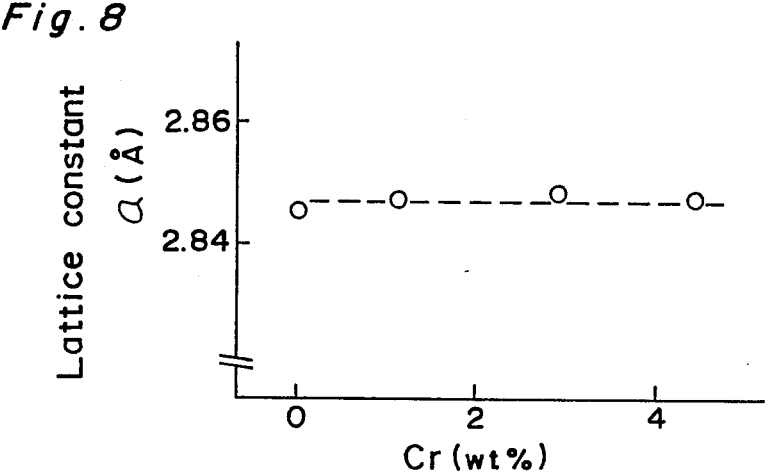
Figure 9:
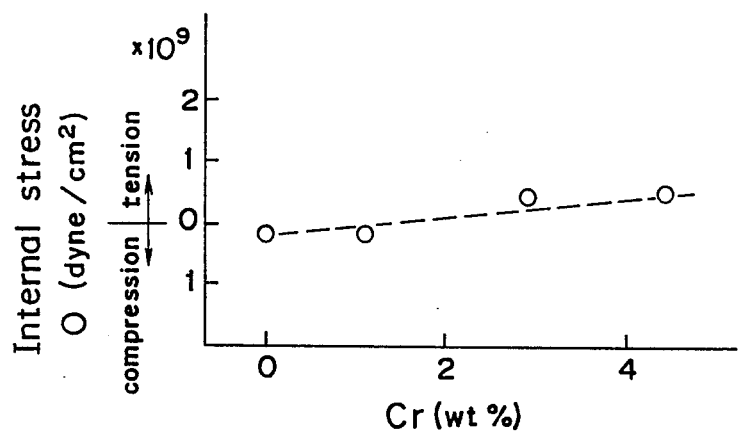
Figure 10:
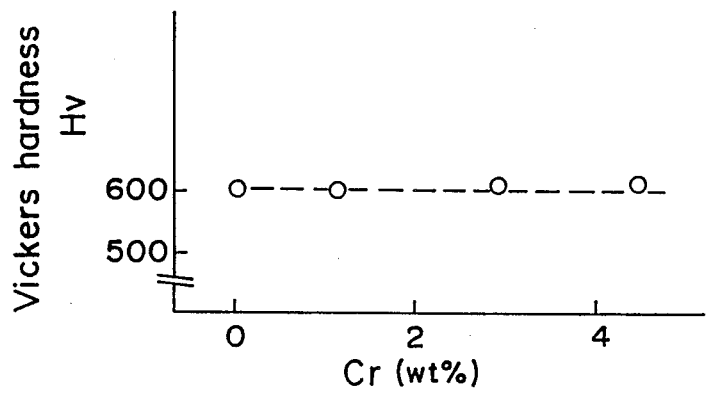

Films having various chromium content were deposited by the electron beam evaporation method mentioned above and subjected to a heat treatment at 600° C. for 8 hours in vacuum. Magnetic properties, electrical properties, physical properties and the lattice constant due to X-ray diffraction of the deposited films are ploted against chromium content, which are shown in FIGS. 4 to 10. As shown in FIGS. 4 to 6, the films have an effective permeability at 1 MHz of 1,000 to 4,000, a saturation magnetization of 950 emu/cc, i.e. a saturation magnetic flux density of 12,000 G, a coercive force of not more than 1.5 Öe within the range of a chromium content of not more than 3 wt %. From these results, it is easy to realize that characteristics of these films are superior to that of the Fe-Si-Al films which do not contain chromium. The Vickers hardness of the films is maintained 600, which shows that hardness is not changed with the chromium content. Internal stress $\nu$ is not so changed with chromium content to show that the film is suitable for manufacturing a magnetic head core. The lattice constant also has the same value. In addition to these result, the compositional distribution in thickness direction is controlled within the range of 1 to 10 wt% of aluminum and 6 to 12 wt% of silicon.

A test for corrosion resistance was carried out by immersing these films mentioned above in a five % NaCl solution for 24 hours. The result is shown in Table 1.

TABLE 1

| Cr content (wt %) | Deposited film surface | Deposited film cross-section |
| --- | --- | --- |
| 0 | no change | Almost change to light brown and scattered corrosion |
| 0.5 | no change | Almost change to light brown |
| 1 | no change | no change |
| 2.9 | no change | no change |
| 4.4 | no change | no change |

It has been found that the addition of chromium of more than 1 wt % to Fe-Si-Al films suppresses the formation of corrosion in the sectional area of the film.

The magnetic head core material of the present invention has not only high magnetic permeability and high saturation magnetic flux density but also has high wear resistance and corrosion resistance even in severe conditions, e.g. in a humid atmosphere or when rubbing at a high velocity against the magnetic tape. The reliability of the magnetic head core material is enhanced.

What is claimed is:

1. A magnetic head core material having high corrosion resistance and high wear resistance consisting of 3 to 6 wt % of aluminum, 7 to 12 wt % of silicon, about 0.5 to not more than 3 wt % of chromium and the substantial balance being iron, said magnetic head core having a compositional distribution in the thickness direction of 1 to 10 wt % of aluminum and 6 to 12 wt % of silicon.

2. The magnetic head core material of claim 1 in which the amount of chromium is 1 to 3 wt%.

* * * * *